W. S. O'BRIEN.

HARROW.

No. 6,947. Reissued Feb. 22, 1876.

Witnesses:

D. R. Richards.

A. B. Moulton

Inventor:

William S. O'Brien,

By W. B. Richards,

Atty.

N. PETERS, PHOTO-LITHOGRAPHER, WASHINGTON, D. C.

UNITED STATES PATENT OFFICE.

WILLIAM S. O'BRIEN, OF KEWANEE, ILLINOIS, ASSIGNOR TO THE O'BRIEN BROTHERS MANUFACTURING COMPANY.

IMPROVEMENT IN HARROWS.

Specification forming part of Letters Patent No. 55,351, dated June 5, 1866; reissue No. 6,947, dated February 22, 1876; application filed July 7, 1875.

*To all whom it may concern:*

Be it known that I, WILLIAM S. O'BRIEN, of Kewanee, county of Henry and State of Illinois, have invented certain Improvements in Harrows, of which the following is a specification:

The nature of my invention relates to improvements in that class of harrows made in sections, and hinged or journaled to each other; and the invention consists in making the harrow in three lateral sections, the central section having a forwardly-extending draft-chain, to which is pivoted an oscillating bar, to the ends of which the side sections are connected by chains, so that the side sections may have a reciprocating motion on the central section through eye and rod connections. It further consists in pivoting the oscillating bar to the draft-chain slightly to one side of its center, for the purpose of preserving the proper relative positions of the harrow in operation; and, further, in the manner of securing, adjustably, the side sections to the central section, all as hereinafter more fully set forth.

To enable others skilled in the art to make and use my invention, I will now proceed to describe the same with reference to the accompanying drawings, in which—

Figure 2:
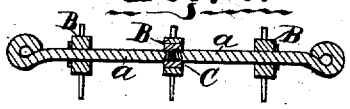
Figure 1:
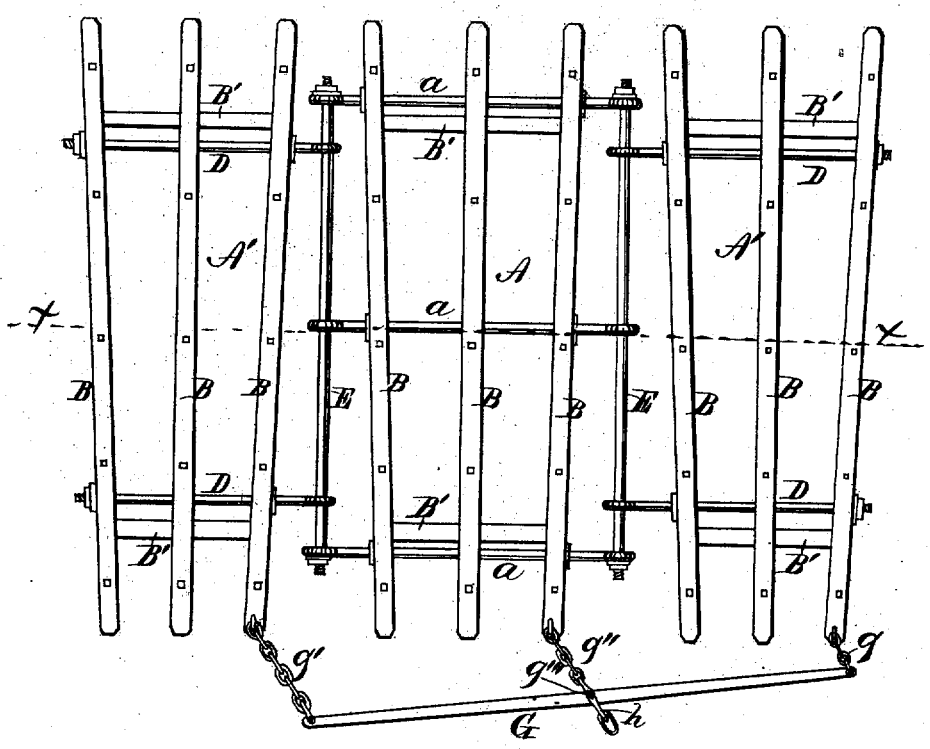

Figure 1 is a top-plan view of a harrow embodying my invention, and Fig. 2 is a sectional view of Fig. 1 on the line *x x*.

Similar letters of reference indicate the like parts in all of the drawings.

Referring to the parts by letters, letter A represents the central, and A′ A′ the side, sections of my improved harrow, each section of which is a complete frame within itself, formed of longitudinal beams B, connected by transverse beams B′. In the central section A three eye-rods, *a a a*, are used on each side. They are introduced through holes first made in the side longitudinal beams of said central section, and then inserted in the screw-nuts C, which are properly secured in openings made in the center longitudinal beam to receive them. (See Fig. 2.) The rods *a* are bent to form eyes on their outer ends, and their other ends are threaded to screw into the nuts C. The outer sections A′ have each two eye-rods, D D, each passing through the longitudinal beams, and properly secured therein by screw-nuts. E E are the coupling-rods, headed at one end, and threaded and carrying nuts at their other ends. G is the draft-bar, its ends connected by chains *g g′* with the ends of the left-hand side longitudinal beams of the side sections A′, the chain *g′* being sufficiently longer than the chain *g* to allow its section to swing back and throw all of the sections diagonal to the line of progression. The central section A is also connected to the bar G by a chain, *g″*, extending from the left-hand side longitudinal beam to a point, *g‴*, in the beam G, somewhat to the left of its center, so as to leave the distance from the chain *g′* to *g* shorter than from *g″* to *g*. The forward end of the chain *g″* may be formed into a clevis, *h*, for the reception of the double-tree, to which the draft-animals are attached; or the clevis *h* may be attached independent of the chain *g″*, but to the point *g‴*, to one side of the center of the draft-bar G, both must be pivoted.

The operations are as follows: The side sections are secured to the central section, as shown at Fig. 1, by passing the rods E through the adjacent eyes in the rods *a* and D, and securing them therein by the nuts on their ends. It will be plainly seen that this connection of the harrows will allow the side sections to have a longitudinal reciprocating movement, or endwise movement, in relation to the central section, and also allow each section to have an oscillating movement in a vertical plane independent of the others. The manner of attaching the sections to the bar G is such as to retain the sections in a favorable working position to each other, and to prevent their binding upon each other, and thus facilitating their freedom of action and increasing their efficiency.

The eye-rods *a* on each side of the central section A may be adjusted independent of each other, and may be, if desired, adjusted so as to retain the sections A A′ A′ parallel with each other, or nearer at their forward or rear ends, as desired.

Having thus described my invention, what

I claim as new, and desire to secure by Letters Patent, is—

1. In combination with the harrow-sections A A′ A′, hinged loosely to each other, as described, the oscillating draft-bar G, pivoted to the draft-chains *g g′ g″* of the harrow-sections, substantially as and for the purpose specified.

2. The oscillating draft-bar G, pivoted to the draft-chain *g″*, slightly to one side of its center, and arranged to operate in combination with the harrow-sections A A′ A′, substantially as and for the purpose specified.

3. The central section A, having the eye-rods *a a a*, and the screw-nuts B, for securing and adjusting the outer sections A′ A′, in the manner and for the purpose described.

WILLIAM S. O'BRIEN.

Witnesses:
LEVI NORTH,
MILO NORTH.